June 18, 1946.    H. B. YOUNG    2,402,268

PISTON

Filed Feb. 7, 1944

INVENTOR.
HENRY B. YOUNG
BY
Lester B. Clark.
ATTORNEY.

Patented June 18, 1946

2,402,268

UNITED STATES PATENT OFFICE 2,402,268

PISTON

Henry B. Young, Houston, Tex., assignor to Mission Manufacturing Company, Houston, Tex.

Application February 7, 1944, Serial No. 521,377

9 Claims. (Cl. 309—4)

The invention relates to a piston particularly adapted for slush pumps used in circulating the drilling mud into and out of a well bore in the rotary method of drilling, but it is capable of use in other types of pumps where abrasive liquids are pumped under high pressure.

In the operation of pistons of the type herein disclosed the piston rod is of substantial diameter and weight and the same is true of the piston body and rubbers so that as a general rule the weight of the piston is carried on the low side thereof where its weight creates a greater pressure against the liner tending to wear the sealing rubbers and the flange of the piston as well. If the flange becomes worn to any substantial extent then it will not support the rubber sealing rings adequately to prevent a blowby of the pressure and permits excessive wear on the seal rings. Heretofore the pistons provided were constructed with the flange as a unitary portion of the piston body and if such flange became worn, it was necessary to either discard the body and replace it with a new construction or to rebuild it with a welding operation, both of which were time consuming and expensive.

The present invention contemplates a piston wherein the part of the piston body subjected to wear is adapted for ready replacement so that the piston body may be used indefinitely and the rubbers and peripheral portion of the flange replaced.

It is one of the objects of the invention to provide a replaceable wear ring on the periphery of a slush pump piston body.

Another object of the invention is to provide a replaceable ring construction for pump piston body flanges wherein the ring and the flange have interfitting portions to insure maintenance of the ring in proper position.

Another object of the invention is to provide a variable size slush pump piston.

Another object of the invention is to provide a snap ring for attachment to the flange of a slush pump piston body.

Other and further objects of the invention will be readily apparent when the following description is considered in connection with the accompanying drawing wherein.

Figure 1:
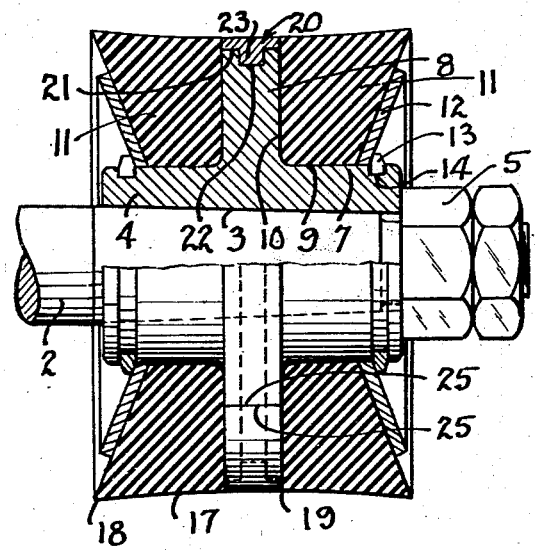
Fig. 1 is a transverse sectional view illustrating a piston assembly to which the invention has been applied.
Figure 2:
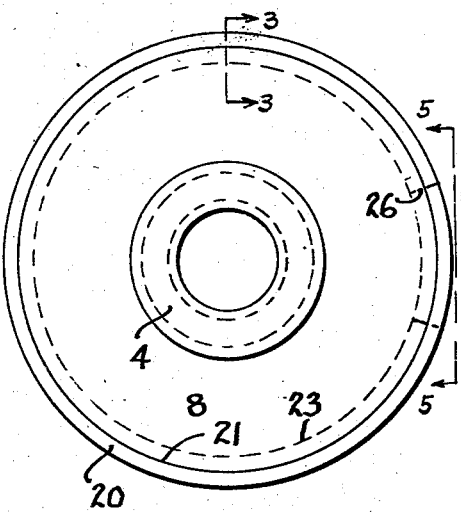
Fig. 2 is an end elevation of a piston body with the rubber seal rings removed and illustrating the attachment of the wear ring.

In Fig. 1 the pump or piston rod 2 has a tapered area 3 thereon to receive the piston body 4 which is retained in position by the nuts 5 threaded on to the end of the rod.

The piston body is of a somewhat standard construction in that it has the hub portion 7 from which the flange 8 projects radially intermediate the ends of the hub. This arrangement provides a circular seating face 9 and a radial seating face 10 for the resilient seal or packing rubbers 11. These rubbers are held in place by a dished plate 12 retained by the lock ring 13 snapped into a groove 14 in the periphery of the hub. With pistons of this type the flange 8 usually projects radially out to the periphery 17 of the sealing rubbers 11 so that when the lip portions 18 of the rubbers are compressed in inserting the piston a sectional view would show substantially a straight line along the length of the piston. Such an arrangement causes the peripherial surface of the flange to come in contact with the liner particularly on the low side of the piston due to the weight of the rod in the piston so that such periphery is worn away to such an extent that it does not support the corner 19 of the rubber seal rings and a pinching action occurs which results in damage to the piston rubber and leakage past the piston.

In the present construction in Fig. 1 a wear ring 20 is shown as having been fitted on to the flange 8 which is somewhat smaller in diameter than the periphery of the rubbers. Fig. 1 shows that the periphery 21 of the flange has been formed with a circular groove 22 and the wear ring 20 has a complementary tongue 23 which seats in this groove so as to fill out the flange and bring it up to the same gauge or size as the piston rubber. This ring 20 may be of any suitable material, either metallic or non-metallic as desired, but preferably it has sufficient inherent resiliency or spring thereto so that it can be enlarged enough to be snapped into the groove 22 very similar to the manner of a piston ring being applied to a piston.

The ends 25 of the ring are shown in the lower center portion of Fig. 1 as being squared with the ring so that they fit closely together.

Figure 5:
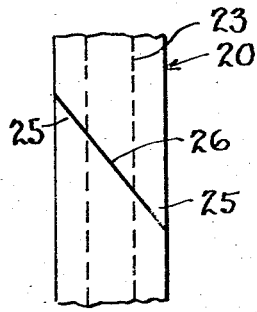
Fig. 5 is a view taken along the line 5—5 of Fig. 2 to illustrate the interfitting and configuration of the wear ring.

Fig. 5 shows that the end portions 25 of the wear ring have been beveled as at 26 so that they fit snugly together when the ring is in position. It seems obvious that this ring may be replaced or removed as desired and other rings substituted therefor when wear has occurred or whenever the piston rubbers are being replaced.

Figures 3, 4:
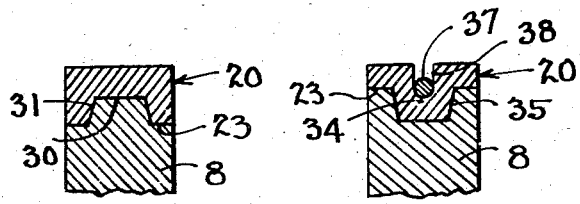
Fig. 3 is a section taken on the line 3—3 of Fig. 2 and illustrating the tongue and groove construction of the flange and ring.
Fig. 4 shows a slightly modified tongue and groove construction.

Fig. 3 shows a slightly modified arrangement of the tongue and groove interfitting construction wherein the flange 8 is provided with a tongue 30 and the ring 20 is provided with a tapered groove 31 which is an inversion of the parts of Fig. 1 and the provision of the tapered arrangement rather than a square configuration of the tongue in section.

Fig. 4 shows another modification which is quite similar to that of Fig. 1 wherein the tongue 34 is tapered and fits into a complementary tapered groove 35 in the flange. A spring ring or wire 37 may be deposited in the groove 38 to retain the adapter ring in place.

Figure 6:
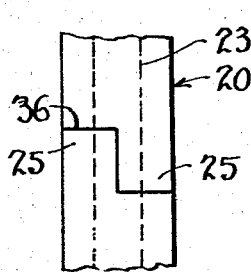
Fig. 6 shows a modified interfitting construction for the ends of the wear ring.

Fig. 6 shows the ends 25 of the ring as having a step configuration 36 so that they will be overlapping to insure retention of the ring in position.

The present invention is of particular advantage in varying the size of the slush pump piston, first to return it to its normal diameter in event of wear or it may be used in providing wear rings having different thicknesses which can be applied to a standard hub and flange construction in event the size of the pump liner and rubbers are to be changed. Very often in the use of the slush pumps a liner becomes worn and it will be rebored or reworked to a slightly larger diameter and in the present practice the whole piston must then be changed, but with this construction the same hub and flange could be used and slightly oversized rubbers and wear ring applied so that a slightly oversized piston could be in this manner provided. For instance, the hub might be arranged to apply an adapter or wear ring to give either a 7, 7¼ or 7½" diameter piston.

The wear rings 20 have been described as being of a single piece of material having sufficient resiliency to be snapped over the periphery of the flange, but it seems obvious that it may be made in two or more portions or segments and applied at will because the pump liner would hold such parts in position or the retainer wire or member of Fig. 4 could be used to retain the parts. These parts may abut along a radial line or otherwise as desired.

What is claimed is:

1. A slush pump piston comprising a rigid body having a radial flange thereon, a resilient sealing ring on said body at each side of said flange, said rings projecting radially beyond said flange, and a replaceable adapter ring carried by the periphery of said flange to provide a wear surface for the flange which is removable independently of the sealing rings.

2. A slush pump piston comprising a rigid body having a radial flange thereon, a resilient sealing ring on said body at each side of said flange, said rings projecting radially beyond said flange, and a replaceable adapter ring carried by the periphery of said flange to provide a wear surface for the flange which is removable independently of the sealing rings, said flange and ring having cooperating tongue and groove portions.

3. In a slush pump piston having a body and a radial flange thereon of less diameter than the assembled piston, the combination of a replaceable ring member fitted on the periphery of said flange, said ring and flange having cooperating tongue and groove portions and overlapping ends on said ring.

4. In a slush pump piston having a body and a radial flange thereon of less diameter than the assembled piston, the combination of a replaceable ring member fitted on the periphery of said flange, said ring and flange having cooperating tongue and groove portions and overlapping ends on said ring having oblique contact faces.

5. In a slush pump piston having a body and a radial flange thereon of less diameter than the assembled piston, the combination of a replaceable ring member fitted on the periphery of said flange, said ring and flange having cooperating tongue and groove portions and overlapping ends on said ring having stepped contact faces.

6. A slush pump piston comprising a rigid body having a radial flange thereon, a resilient sealing ring on said body at each side of said flange, said rings projecting radially beyond said flange, a replaceable adapter ring carried by the periphery of said flange to provide a wear surface to contact the pump liner, said adapter ring being composed of a plurality of segments.

7. In a slush pump piston having a body and a radial flange thereon of less diameter than the assembled piston, the combination of a replaceable multiple part-ring member fitted on the periphery of said flange.

8. In a slush pump piston having a body and a radial flange thereon of less diameter than the assembled piston, the combination of a replaceable segmental ring member fitted on the periphery of said flange, said ring and flange having cooperating tongue and groove portions and overlapping ends on said ring having oblique contact faces.

9. In a slush piston having a body and a radial flange thereon of less diameter than the assembled piston, the combination of a replaceable ring member of the same width as the thickness of the flange and fitted on the periphery of said flange to provide a replaceable wearing surface.

HENRY B. YOUNG.